C. P. STEINMETZ.
ALTERNATING CURRENT DYNAMO ELECTRIC MACHINE.
APPLICATION FILED AUG. 13, 1908.
935,941.
Patented Oct. 5, 1909.
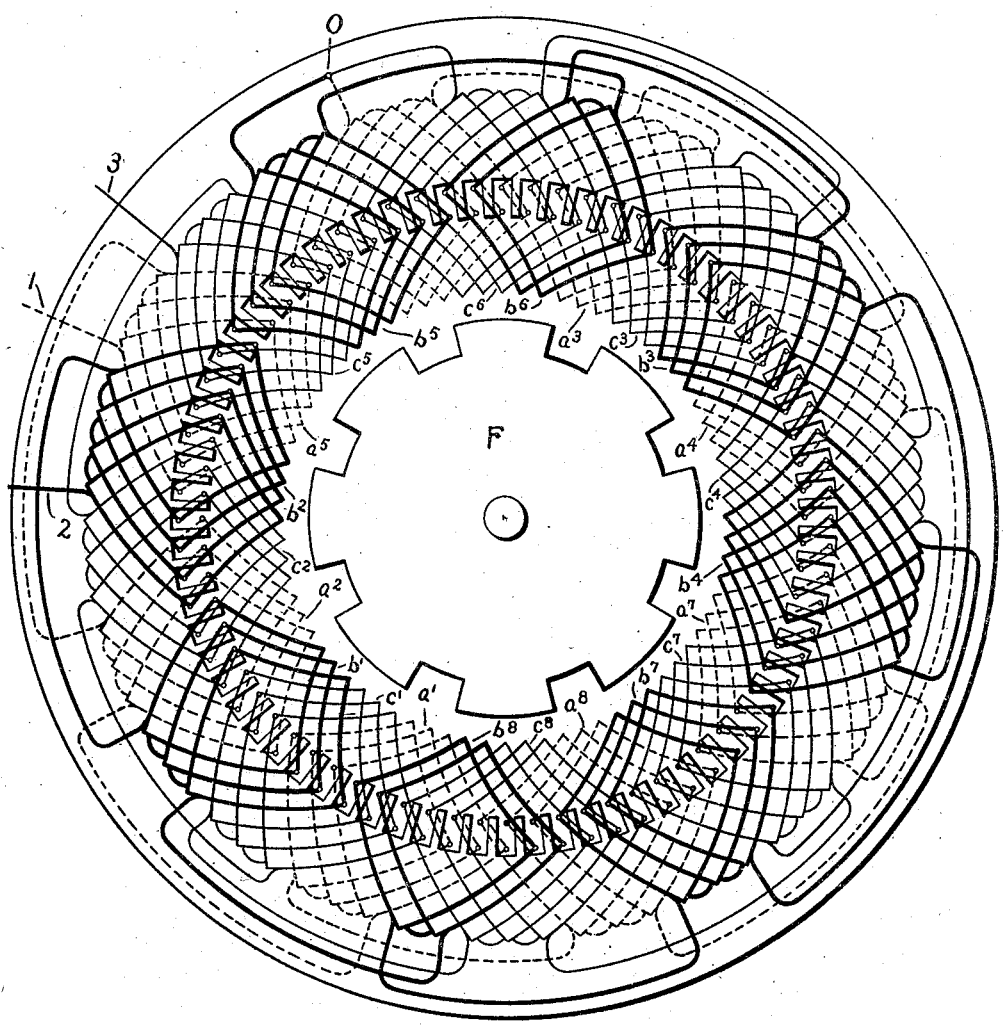

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ALTERNATING-CURRENT DYNAMO-ELECTRIC MACHINE.

935,941. Specification of Letters Patent. Patented Oct. 5, 1909.

Application filed August 13, 1908. Serial No. 448,275.

*To all whom it may concern:*

Be it known that I, CHARLES P. STEINMETZ, a citizen of the United States, residing at Schenectady, in the county of Schenectady, State of New York, have invented certain new and useful Improvements in Alternating-Current Dynamo-Electric Machines, of which the following is a specification.

My invention relates to alternating current dynamo electric machines and its object is to provide a novel and simple form of armature winding whereby a true sine wave of induced electromotive force is attained.

Theoretically it is possible to shape the field poles of an alternator so that the distribution of magnetic flux in the wave gap is sinusoidal and a perfect sine wave of electromotive force is induced. Such a shape of the field poles, however, is not practically possible and in most instances is mechanically not permissible, and alternators as constructed, therefore, give an electromotive force wave differing more or less from a sine wave. For many purposes, especially where the circuits contain considerable capacity, as prefect a sine wave as possible is desirable.

In a three phase alternator, especially with Y connected armature, the third harmonic cancels in the electromotive force between the lines. The voltage between lines 1 and 2 for instance consists of the voltage of two phases, 1 to 0 and 0 to 2 (where 0 is the neutral point of the armature) connected in series so as to be 60 degrees displaced in phase; and 60 degrees phase displacement for the fundamental is 3×60, or 180 degrees displacement, or opposition, for the third harmonic, and the latter, therefore, cancels as is well understood in the art. Even though the third harmonic is thus eliminated in a three phase machine by the connections of the phases to each other the wave of induced electromotive force may be very different from a sine wave because of the presence of higher harmonics. Assuming now, however, that the armature coils are not wound full pitch but with fractional pitch, so that the two sides of the coil are separated from each other on the armature circumference not by full pitch but by the pole pitch $x\,(1\pm\frac{1}{n})$. In such a case the voltages induced in the two sides of the coil are not in phase with each other, but differ in phase by $\frac{1}{n}$ of a half way, and the $n$th harmonic differs in the two sides of the coil by $n\times\frac{1}{n}$ of a half wave, or by 180 degrees, that is, they are in opposition to each other and therefore cancel. That is, by giving the armature coils a fractional pitch of $1-\frac{1}{n}$ the $n$th harmonic in each coil cancels. For instance, by giving the armature coils a 4/5 pitch the fifth harmonic may be eliminated in each coil. Assuming now we have another armature coil of the same fractional pitch of $1\pm\frac{1}{n}$ and, therefore, free of the $n$th harmonic but displaced in position from the former on the armature periphery not by a pole pitch, but the pole pitch $x\,(1\pm\frac{1}{m})$, then the electromotive forces in the two armature coils are $\frac{1}{m}$ of a half wave displaced from each other in phase, and their $m$th harmonics are, therefore, in opposition, so that if the two coils are connected in series the resultant voltage produced by such a pair of coils is free of the $n$th and also of the $m$th harmonics.

In a three phase Y connected alternator having armature coils of 4/5 pitch and half the armature coils of each phase displaced in opposition to the other half by 1/7 pitch the voltage between the terminals is free of the third harmonic (and its overtones, such as the ninth harmonic) and also of the fifth and of the seventh harmonics, and is thus very close to a sine wave, the eleventh harmonic being the lowest which can exist.

It will be seen that the method of eliminating harmonics by displacing certain of the coils with respect to others in series with them can be carried farther so as to eliminate harmonics up to any desired number. For instance, if the pair of coils above mentioned, displaced from each other by the pole pitch $x\,(1\pm\frac{1}{m})$ and displaced from a similar pair of coils by the pole pitch $x\,(1\pm\frac{1}{p})$, then if the four coils are connected in series both the $m$th and the $p$th harmonics are eliminated. The only limitation is the increasing complication of the armature winding. Where, however, only the three lowest harmonics are to be eliminated, by three phase connection, fractional pitch, and one coil displacement the complication is not appreciable, and such an arrangement gives a wave of electromotive force which is close enough to a sine wave for ordinary commercial purposes. If a perfect sine wave is required, as for telephone work, the elimination can be carried to any desired extent.

It will be understood that the elimination of harmonics by the above method does not involve the use of an irregular winding, but on the contrary all the coils may be of the same width as in a standard machine.

For ordinary commercial purposes an exact elimination of the harmonics is not necessary, but an approximate elimination is sufficient. For instance, in a three phase alternator having three coils per pole per phase, that is, nine slots per pole, a fractional pitch of 4/5 cannot be employed. A fractional pitch of 7/9, however, may be employed and this is close enough to 4/5 practically to eliminate the fifth harmonic. Similarly in such a machine a displacement of certain of the coils from the others by exactly 1/7 of the pole pitch cannot be obtained, but a displacement of 1/9 can be obtained, and such a displacement is adapted substantially to eliminate both the seventh and the eleventh harmonics.

My invention will best be understood by reference to the accompanying drawing, which shows diagrammatically a three phase alternator arranged in accordance with my invention to produce a wave of electromotive force which is substantially a sine wave.

In the drawing F represents the field magnet, which is shown with eight poles. The armature is shown diagrammatically with 72 slots, 9 per pole, and has a three phase winding of three coils per pole per phase. To facilitate reading the drawing the several phases are indicated by lines of different characters, one phase, to which reference letters $a$ are applied, being shown in dotted lines, the second phase, to which reference letters $b$ are applied, being shown in heavy full lines, and the third phase to which reference letters $c$ are applied, being shown in light full lines. The three phases have a common terminal 0 and the other terminals are indicated at 1, 2 and 3. The three phases are thus connected in Y, so that between each pair of terminals 1 to 2, 2 to 3, and 3 to 1 the third harmonic and its overtones are eliminated, as has been heretofore explained. It will further be seen that each coil spans seven slots, or in other words, has a pitch of 7/9. Since this is approximately equal to 4/5 the fifth harmonic is substantially eliminated in each coil as heretofore explained. Furthermore, while the total number of coils of each phase is 24, that is, three per pole, the coils of each phase are not grouped in the usual manner with three coils at each pole, but on the contrary the groups of coils at the several poles differ in the number of coils per group. For instance, considering the phase shown in heavy full lines, to which reference letters $b$ are applied, exponents being used to denote the different groups, it will be seen that starting at group $b^1$ and proceeding in a clockwise direction around the armature the number of coils in the groups are as follows: $b^1$, 3 coils; $b^2$, 4 coils; $b^5$, 3 coils; $b^6$, 2 coils; $b^5$, 3 coils; $b^4$, 4 coils; $b^7$, 3 coils, and $b^8$, 2 coils, that is, groups $b^2$ and $b^4$ each have one coil in excess, while groups $b^6$ and $b^8$ have a deficit of one coil each. The result of this grouping of coils is to displace half the coils of the phase from the other half. For instance, considering groups $b^1$ and $b^5$ it will be seen that the coils in these two groups instead of being displaced by 18 slots, that is, twice the pole pitch, are displaced from each other by 19 slots. In other words, the two groups of coils are offset from each other by a slot, that is, by 1/9 of the pole pitch. Similarly, groups $b^2$, $b^3$ and $b^4$ are offset from groups $b^6$, $b^7$ and $b^8$ respectively by one slot. In other words, half the coils of the phase are offset from the remaining coils of the phase by 1/9 the pole pitch, and this offset as has heretofore been explained, results in the substantial elimination of both the seventh and the eleventh harmonics.

It will be seen that the arrangement above described while substantially eliminating all harmonics below the thirteenth does not complicate the armature winding. It will further be seen that elimination of still higher harmonics may be obtained by carrying farther the principle of offsetting certain coils with respect to others. Consequently I do not desire to limit myself to the particular arrangement shown, but desire to cover by the appended claims all modifications which are within the scope of my invention.

What I claim as new and desire to secure by Letters Patent of the United States, is—

1. An alternating current dynamo-electric machine having its armature wound with uniform coils of a pitch adapted substantially to prevent the induction in said coils of one harmonic of the induced electromotive force and certain of said coils offset with respect to other coils in series with them by an amount adapted substantially to eliminate another harmonic.

2. A polyphase dynamo-electric machine having its phases so connected as to eliminate one harmonic of the induced electromotive force and having uniform coils of a pitch adapted substantially to eliminate another harmonic, certain of the coils of each phase being offset with respect to the other coils of that phase by an amount adapted substantially to eliminate still another harmonic.

3. A three phase alternator of three coils per pole per phase having its phases connected in Y, its armature coils of 7/9ths pitch, and certain of the coils of each phase offset with respect to the others by 1/9th of the pole pitch.

4. An alternating current dynamo-electric machine having certain of its armature coils offset with respect to others in series with them by an amount adapted substantially to eliminate a harmonic of the induced electromotive force.

5. A polyphase dynamo-electric machine having its phases so connected as to eliminate one harmonic of the induced electromotive force and having certain of the coils of each phase offset with respect to the other coils of that phase by an amount adapted substantially to eliminate another harmonic.

In witness whereof, I have hereunto set my hand this 11th day of August, 1908.

CHARLES P. STEINMETZ.

Witnesses:
BENJAMIN B. HULL,
THOMAS W. NOONAN.